United States Patent [19]

Suzuki

[11] Patent Number: 5,025,397

[45] Date of Patent: Jun. 18, 1991

[54] LABEL PRINTER

[75] Inventor: Michio Suzuki, Shizuoka, Japan

[73] Assignee: Tokyo Electric Co., Ltd., Tokyo, Japan

[21] Appl. No.: 396,537

[22] Filed: Aug. 21, 1989

[30] Foreign Application Priority Data

Aug. 24, 1988 [JP] Japan .............................. 63-210010
Mar. 6, 1989 [JP] Japan .................................. 1-53193

[51] Int. Cl.$^5$ ................................................ G06K 15/00
[52] U.S. Cl. ..................................... 364/519; 364/900; 364/930
[58] Field of Search ............................. 364/518-520, 364/930 MS File, 238 MS File; 346/154; 358/296, 300, 404

[56] References Cited

U.S. PATENT DOCUMENTS 4,837,709  6/1989  Sasaki ............................ 364/519

FOREIGN PATENT DOCUMENTS 62-199477  9/1987  Japan ............................. 364/519

Primary Examiner—Arthur G. Evans
Attorney, Agent, or Firm—Frishauf, Holtz, Goodman & Woodward

[57] ABSTRACT

A label printer comprises an input section for inputting printing data, a frame memory for storing image data derived from the printing data, a printing section for printing an image corresponding to the image data on label paper, and a control circuit for creating the image data based on the printing data, storing the image data into the frame memory, and transferring the image data stored in the frame memory to the printing section. In the label printer, the frame memory stores items of image data derived from different printing data input by the input section, and the control circuit checks whether or not image data corresponding to the input printing data is stored in the frame memory, and transfer the image data stored in the frame memory to the printing section when it is detected that the image data is stored in the frame memory.

8 Claims, 8 Drawing Sheets

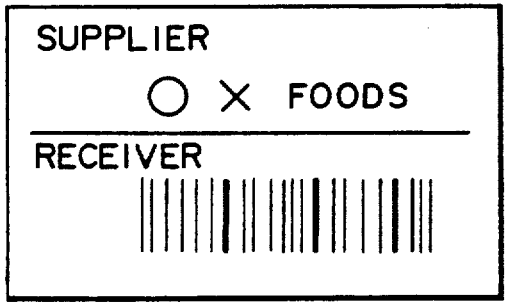
F I G. 1A
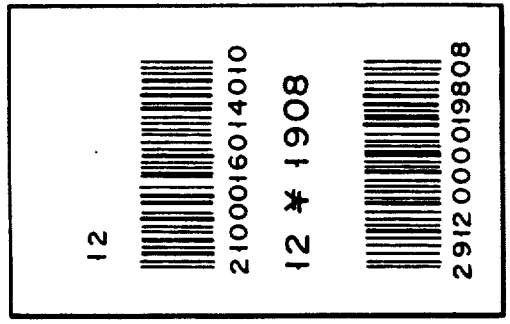
F I G. 1B

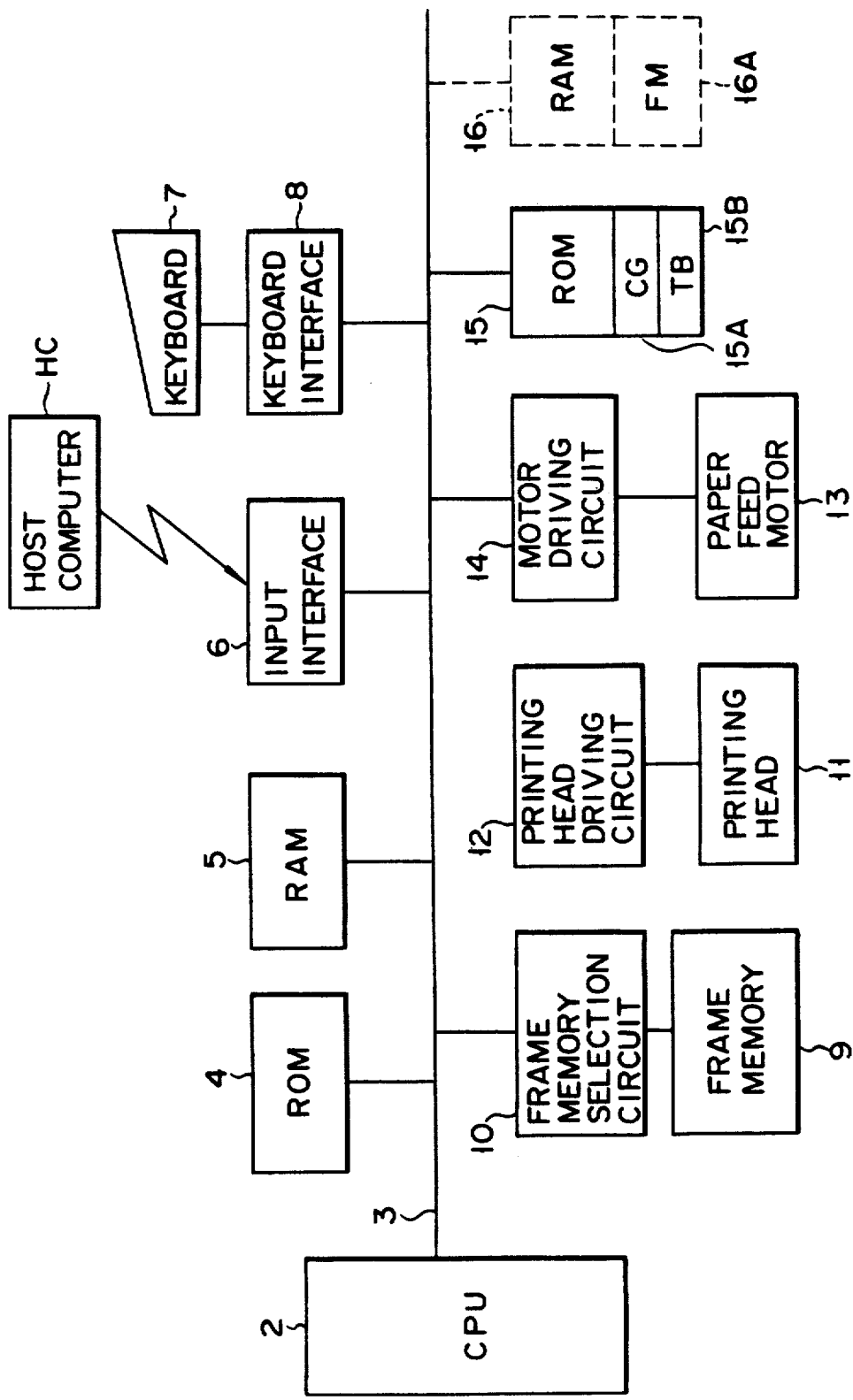
F I G. 3

| RECEIVER | DOCK / GATE | | |
|---|---|---|---|
| ADVICE NOTE NO (N) | SUPPLIER ADDR | | |
| | NET WT(KG) | GROSS WT(KG) | NO.BOXES |
| PART NO(P) | | | |
| QUANTITY (Q) | DESCRIPTION | | |
| | SUPPLIER PART NO | | |
| SUPPLIER (V) | ENGR. CHANGE | | |
| | PROD LATE | HAZARD CODE | |
| SERIAL (S/M/G) | CHARGE NO (H) | | |
F I G. 8
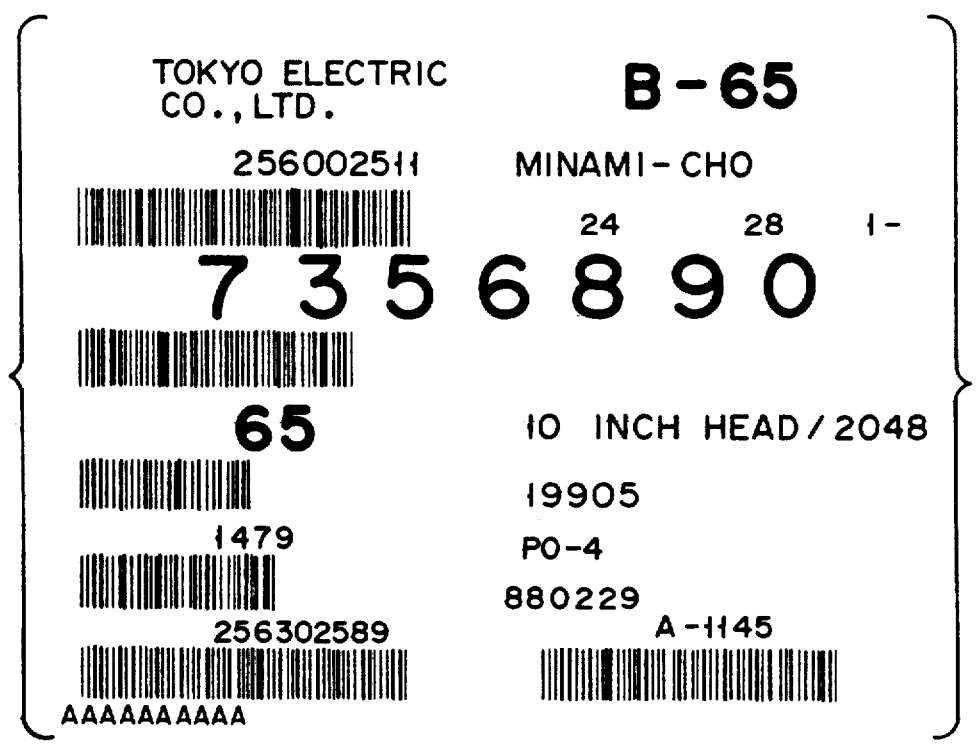
F I G. 9

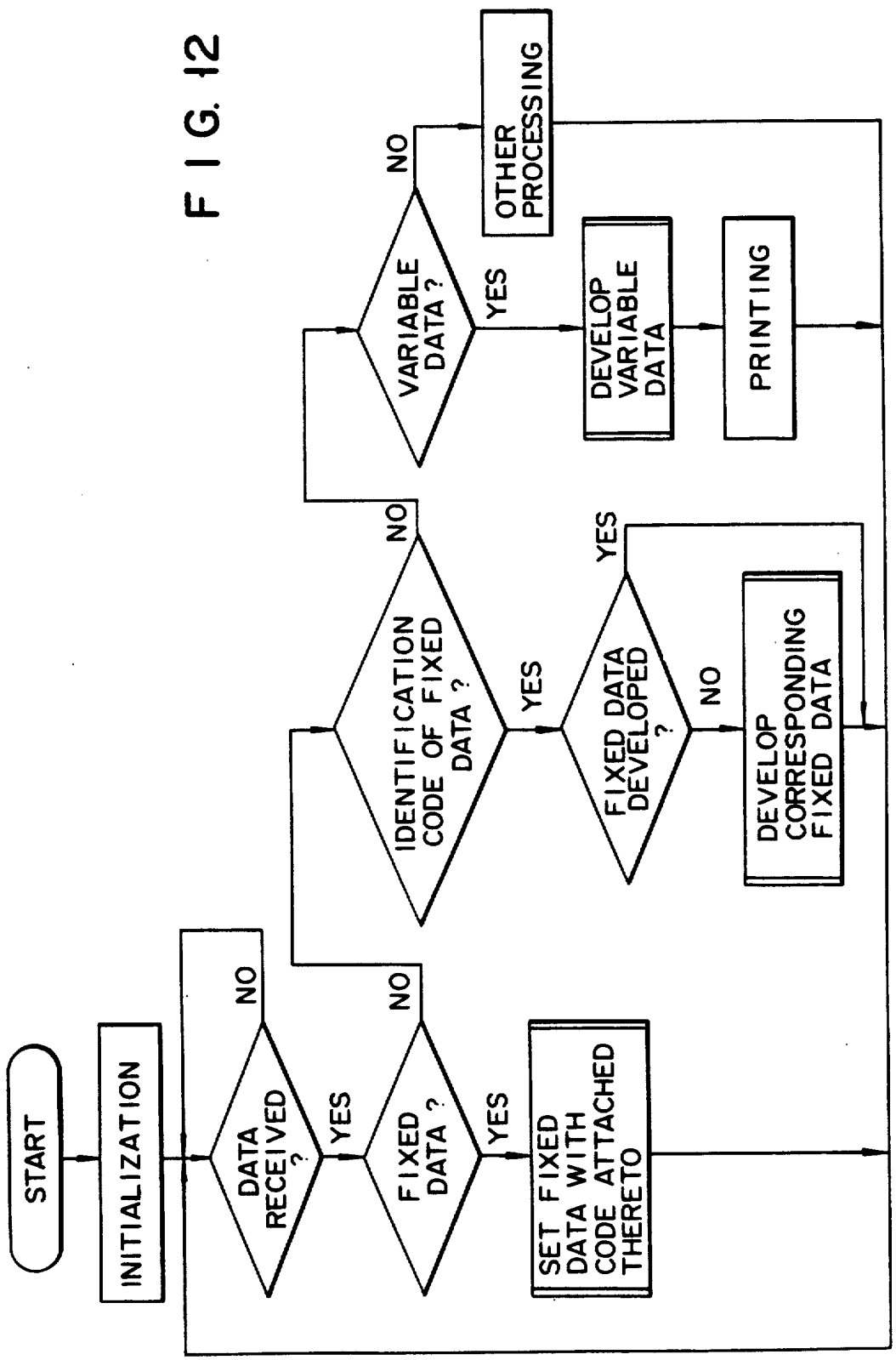

LABEL PRINTER

BACKGROUND OF THE INVENTION

1. Field of the Invention

This invention relates to a label printer for issuing various types of labels.

2. Description of the Related Art

Supermarkets or suppliers, as a routine procedure, attach labels to various articles such as foodstuffs and daily necessaries to be sold, the labels each bearing an article code, supplier's name, price and other article information. FIGS. 1A and 1B show examples of the label. The article code is represented in the bar code form and the supplier's name and price are represented in the form of character or numeral. The label is issued from a label printer which receives externally supplied printing data, creates image data representing an image to be printed on labels in a dot matrix form based on the printing data, and performing a printing operation for the image data.

The conventional label printer includes a buffer memory, a character generator, a bar code conversion table, a frame memory and a printing section, for example. The printing data includes character and numeral codes corresponding to article information to be printed on a label, format data specifying the printing position, magnification, style and the like of data represented by the codes, issuing-number data specifying the number of labels to be issued and the like and is stored in the buffer memory. The printing data stored in the buffer memory is developed into image data by use of the character generator and the bar code conversion table. In the developing process, the character generator generates a character pattern according to the character or numeral code and the bar code conversion table converts the numeral code into a bar code pattern. Image data thus obtained is temporarily stored in the frame memory and then transferred from the frame memory to the printing section. The printing section prints an image on label paper based on the image data.

In a case where various articles which are packed in boxes for each kind are carried into an area in which the label printer is installed, the same type of labels corresponding in number to the articles packed in one box can be continuously issued. However, when various articles are packed in one box, it becomes difficult to continuously issue a large number of labels of the same type. FIG. 2 shows labels issued when the printing data is frequently changed according to the kinds of articles.

In the conventional label printer, image data is created by developing printing data each time the printing data is changed. The developing process of the printing data is complicated and takes a long time. Therefore, it is impossible to effect the printing operation for the printing data immediately after the printing data is changed, thereby lowering the average label issuing speed. This is the main cause of delaying the operation of attaching labels to various kinds of articles.

SUMMARY OF THE INVENTION

An object of this invention is to provide a label printer capable of reducing the preparation time for printing.

The above object can be attained by a label printer comprising an input section for inputting printing data; a memory section for storing image data derived from different printing data; an printing section; and a control circuit for checking whether or not image data corresponding to the printing data input by the input section is stored in the memory section, transferring the image data from the memory section to the printing section to cause the printing section to print an image corresponding to the image data on label paper when it is detected that the image data is stored in the memory section, and creating image data based on the input printing data, storing the image data into the memory section and transferring the image data to the printing section to cause the printing section to print an image corresponding to the image data on label paper when it is detected that the image data is not stored in the memory section.

In the above label printer, items of image data which have been used for the printing operation can be stored into the memory section. Therefore, when the printing data is input, it becomes possible to check whether or not image data corresponding to the input printing data is stored in the memory section. When the image data is stored in the memory section, the image data is transferred from the memory section to the printing section. In this case, since it is not necessary to newly create image data based on the input printing data, the preparation time for the printing operation can be reduced. Further, since the same image data will not be stored in two or more memory areas of the memory section, the memory capacity of the memory section can be effectively used.

BRIEF DESCRIPTION OF THE DRAWINGS

FIGS. 1A and 1B show examples of a label;

FIG. 3 is a block diagram schematically showing the circuit construction of a label printer according to one embodiment of this invention;

FIG. 8 shows examples of label paper having ruled lines and titles previously printed thereon;

FIG. 9 shows an example of an image printed on a label;

FIG. 12 is a flowchart showing the label issuing process of the label printer of a third embodiment.

DETAILED DESCRIPTION OF THE PREFERRED EMBODIMENTS

Figure 2:
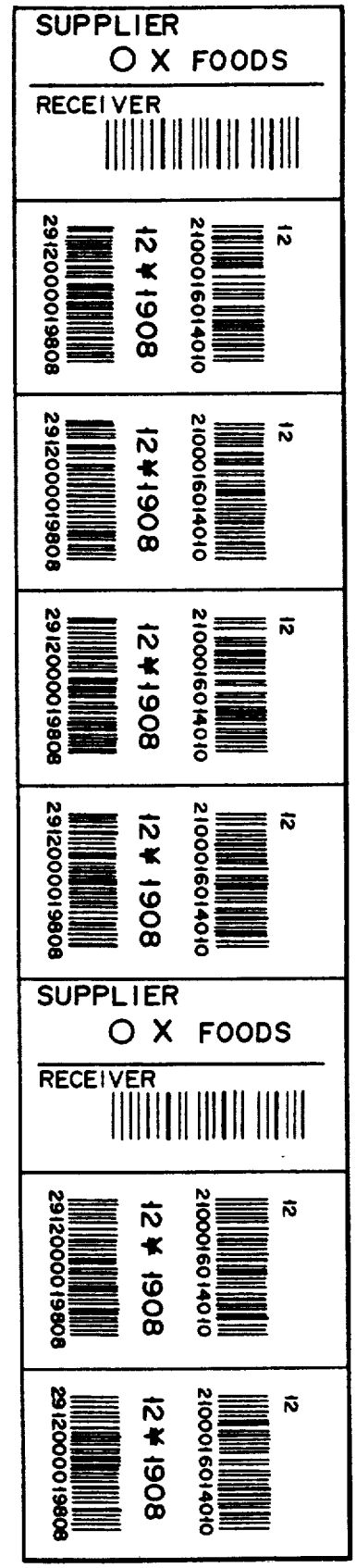
FIG. 2 shows examples of labels issued when the printing data is frequently changed according to the kinds of articles.

The will now be described an embodiment of this invention with reference to FIGS. 3 to 6.

FIG. 3 is a block diagram schematically showing the circuit construction of a label printer according to one embodiment of this invention. The label printer includes a CPU 2 for processing various information. The CPU 2 is connected to a ROM 4, RAM 5, input interface 6, keyboard interface 8, frame memory selection circuit 10, printing head driving circuit 12, motor driving circuit 14 and ROM 15 via a bus line 3. The ROM 4 stores the control program for the CPU 2 and the RAM 5 stores various data processed by the CPU 2. Input interface 6 is constituted by an asynchronous transceiver (UART), for example, and receives printing data supplied from an external host computer HC. The keyboard interface 8 receives various key signals generated from a keyboard 7. The frame memory selection circuit 10 is connected to a frame memory 9 which stores a plurality of items of image data each representing character, numeral or bar code in the dot matrix form and serves to access the frame memory 9. The printing head driving circuit 12 receives image data read out from the frame memory 9 and transmits dot data constituting the dot matrix of the received image data to a printing head 11 for each line. The printing head 11 is constituted by a thermal head, for example, and prints an image corresponding to the received image data on label paper. The motor driving circuit 14 drives a paper feed motor 13 for feeding a roll of paper to which label paper is removably attached. The paper feed motor 13 may be a stepping motor, for example.

Various operation keys such as a printing starting key and paper feed key and a power source switch are disposed on the keyboard 7.

The frame memory 9 has a memory capacity capable of storing items of image data for six labels of a predetermined size.

Figure 4:
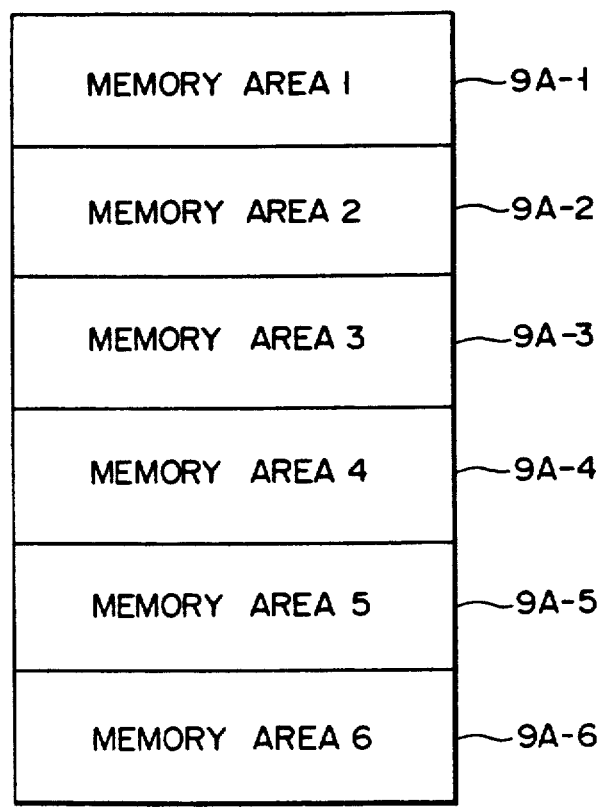
FIG. 4 shows the memory areas of a frame memory shown in FIG. 3.

As shown in FIG. 4, the frame memory 9 is divided into six memory areas 9A-1 to 9A-6 each used for storing image data for one label. The frame memory selection circuit 10 selects one of the memory areas 9A-1 to 9A-6 to read out image data or writing image data into the selected memory area.

Figure 5:
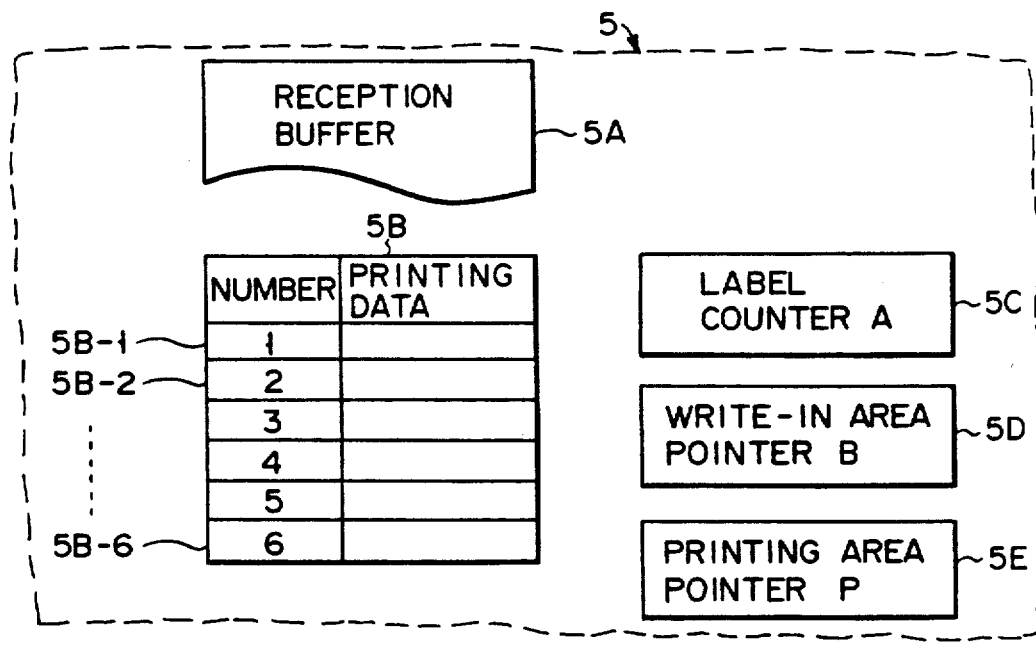
FIG. 5 is a memory map of a RAM shown in FIG. 3.

As shown in FIG. 5, the RAM 5 includes a reception buffer 5A, a data memory 5B, a label counter 5C, a write-in area pointer 5D, and printing area pointer 5E. The reception buffer 5A temporarily stores printing data input to the input interface 6. The data memory 5B has six memory areas 5B-1 to 5B-6 assigned to the memory areas 9A-1 to 9A-6 of the frame memory 9, for respectively storing printing data corresponding to image data stored in the memory areas 9A-1 to 9A-6 of the frame memory 9. The label counter 5C stores label-number data A indicating the remaining number of labels to be printed and issued based on the same image data. The write-in area pointer 5D stores number data B specifying one of the memory areas 9A-1 to 9A-6 as a memory area for storing newly created image data, and the printing area pointer 5E stores number data P specifying one of the memory areas 9A-1 to 9A-6 as a memory area for storing image data to be printed by means of the printing head 11.

The ROM 15 includes an area 15A previously storing character patterns of various characters, numerals or the like and constituting a character generator and an area 15B previously storing bar code patterns and constituting a bar code conversion table.

Figure 6:
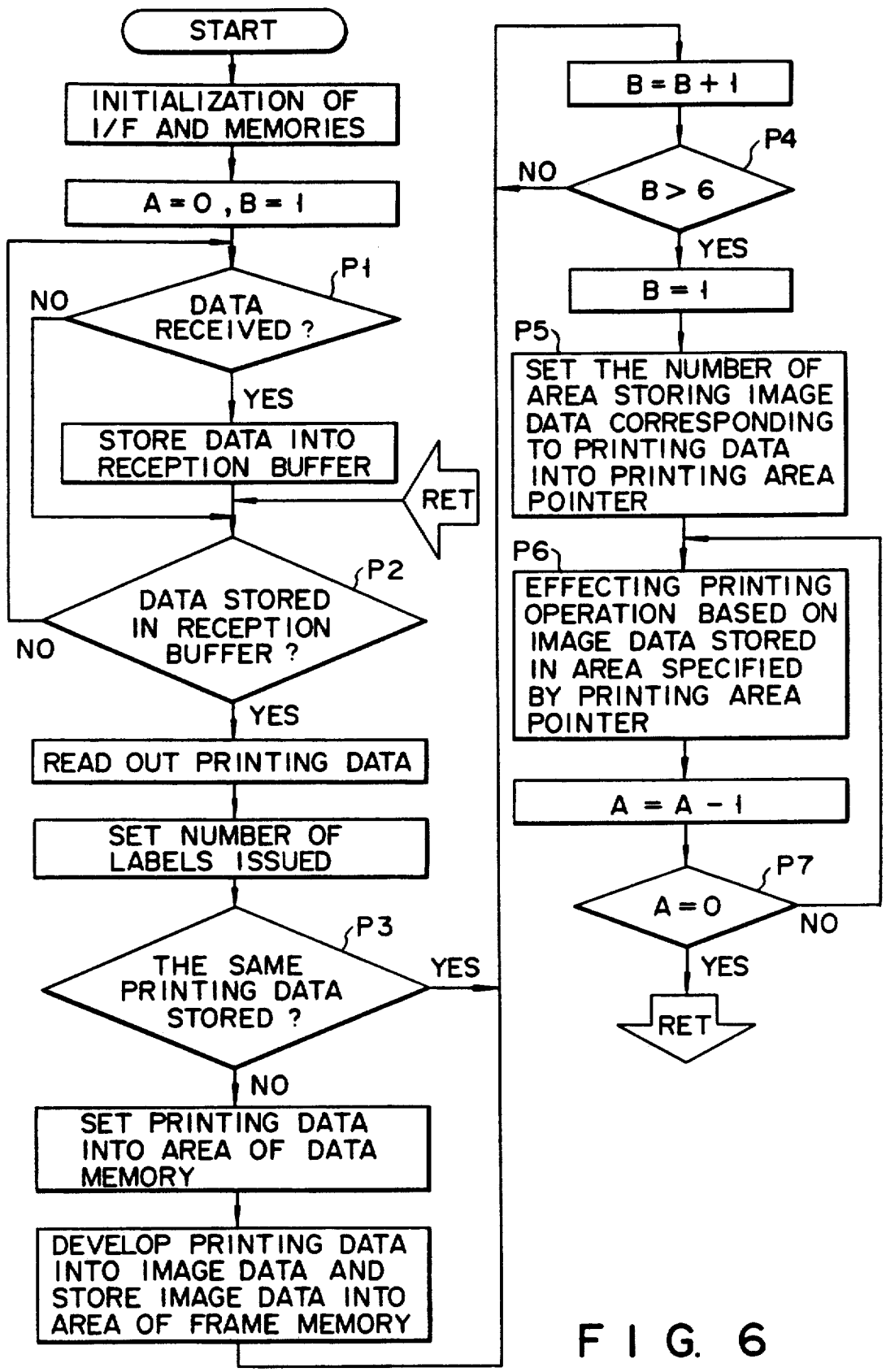
FIG. 6 is a flowchart explaining the label issuing process effected for printing an image corresponding to input printing data on label paper.

Now, the operation of the above printer is explained with reference to FIG. 6. FIG. 6 is a flowchart explaining the label issuing process effected for printing an image corresponding to input printing data on label paper and issuing the printed label paper as a label. The label issuing process is effected by causing the CPU 2 to execute the control program stored in the ROM 4 after the power source is turned on.

When the process shown by the flowchart of FIG. 6 is started, the interface 6, the frame memory 9, and the RAM 5 are initialized. In this initializing, the memory areas 9A-1 to 9A-6 are provided in the frame memory 9, and the memory areas 5B-1 to 5B-6 are provided in the RAM 5. Then, "0" is set as the initial value of label number data A into the label counter 5C of the RAM 5 and "1" is set as the initial value of number data B into the write-in area pointer 5D. After this, if it is detected in the step P1 that printing data is input to the input interface 6, the printing data is temporarily stored into the reception buffer 5A. In this case, the printing data includes character and numeral codes, format data specifying the printing position, magnification, style, and the like and label-number data specifying the number of labels to be issued which correspond to article information printed on one label.

If it is detected in the step P2 that one item of printing data has been input into the reception buffer 5A, the printing data is read out therefrom and label-number data included in the readout printing data and specifying the number of labels to be issued is stored as the remaining label number data A into the label counter 5C of the RAM 5.

Then, the data memory 5B of the RAM 5 is searched for the other printing data except label-number data. If the same printing data is not detected, the printing data except the numeral data indicating the label issuing number is stored into one of areas 5B-1 to 5B-6 of the data memory 5B which corresponds to the number data B stored in the write-in area pointer 5D. Further, the printing data is developed and converted into image data by use of the character generator 15A or the bar code conversion table 15B. Then, the image data is stored into one of the memory areas 9A-1 to 9A-6 which is specified by the number data B stored in the write-in area pointer 5D. After this, the number data B stored in the write-in area pointer 5D is incremented by "1". When the content of the pointer 5D is incremented and has exceeded "6", "1" is set into the pointer 5D as the number data B.

In the step P5, printing area pointer 5E stores the area number of the memory area in which the image data created from the input printing data is stored, as the number data P. In the step P3, if it is detected that the same printing data is stored in the data memory 5B, image data corresponding to the printing data is stored in that area of the frame memory 9 which corresponds to the area in which the printing data is stored. Therefore, in the step P5, the area number of the area in which the image data is stored is set as the number data P into the printing area pointer 5E.

Then, in the step P6, image data is read out from one of the areas 9A-1 to 9A-6 which is specified by the number data P stored in the printing area memory 5E of the RAM 5 and then supplied to the printing head 11 which in turn prints an image corresponding to the image data on label paper. The label paper thus printed is issued as a label. After the label issuing process for one label is completed, the number data A stored in the label number counter 5C is decremented by "1". Then, if it is detected in the step P7 that the number data A has not reached "0", the step P6 is again effected and a next label is issued based on the same image data.

When it is detected in the step P7 that the number data A has reached "0", it is determined that a specified number of labels for the input printing data have been issued, and the step P2 is effected again to read out next printing data from the reception buffer 5A.

With the label printer of the above construction, if printing data including label-number data specifying the number of labels to be issued is supplied from the external host computer, for example, it is first checked whether the printing data is already stored in the data memory 5B or not. If it is detected that the printing data is already stored therein, it is determined that the label printing operation was previously effected based on the same printing data as the input printing data. Then, image data corresponding to the input printing data is read out from the frame memory 9 and is used for the label printing operation.

If the input printing data is not stored in the data memory 5B, it is determined that image data corresponding to the input printing data is not stored in the frame memory 9. Therefore, the input printing data is set into the data memory 5B and image data is created based on the input printing data and stored into the frame memory 9. Further, the image data is read out from the frame memory 9 and is used for the label printing operation.

As described above, six memory areas 9A-1 to 9A-6 each capable of storing image data for one label are provided in the frame memory 9, and therefore six different items of image data can be stored in the frame memory 9. That is, if new printing data is input and image data is created based on the input printing data, the image data can be used for the label printing operation unless six different items of printing data are newly input. Therefore, in a case where image data corresponding to the input printing data is stored in the frame memory 9, it is possible to omit the process of converting the input printing data into image data by use of the character generator or bar code conversion table and storing the image data into the frame memory 9. As a result, the average label issuing speed can be enhanced.

For example, assume that two kinds of labels are issued in an order indicated as shown in FIG. 2. In this case, the number of processes effected for converting input printing data into image data and storing the image data into the frame memory is only two. Since it is necessary to effect the same processes four times with the conventional label printer, the label issuing speed can be enhanced by the number of processes reduced in comparison with conventional label printer. As a result, the operation of attaching labels to articles can be effected without much delay.

Figure 7:
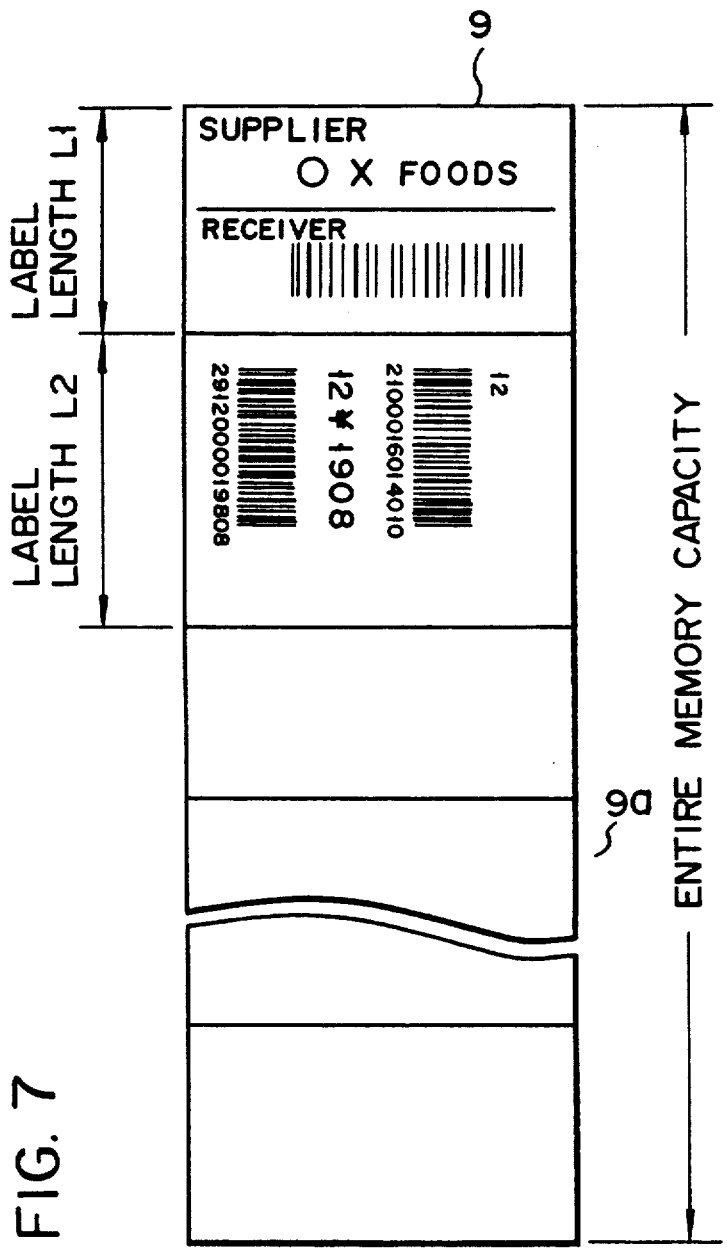
FIG. 7 is a modification of frame memory shown in FIG. 3.

This invention is not limited to the above embodiment. In the above embodiment, labels of the same size are issued. Therefore, a plurality of memory areas 9A-1 to 9A-6 obtained by dividing the frame memory 9 are formed to have the same memory capacity. In a case where the label printer is constituted to issue labels of different sizes, it is not necessary to previously determine the memory capacity of a memory area of the frame memory 9 into which image data for one label is stored. Instead, it is possible to set the memory capacity of the memory area of the frame memory 9 according to the size of image data which is derived by converting new input printing data before the image data is stored into the frame memory 9 as shown in FIG. 7. If the memory capacity of the memory area can be variably set as described above, the entire memory area of the frame memory 9 can be effectively used. In this case, the number of areas which can be set in the frame memory 9 to store image data for one label is varied. Therefore, it is necessary to replace the number "6" compared with the number data B in the step P4 in the former embodiment by the number of memory areas for storing image data currently provided in the frame memory 9.

Next, a label printer according to a second embodiment of this invention is explained with reference to FIGS. 8 to 11. Most labels are issued by printing data on label paper on which information such as ruled lines and titles as shown in FIG. 8 are previously printed. However, in some cases, the label printer is required to print such items of information. In this case, printing data includes data for printing items of information such as ruled lines and titles. In this embodiment, data for printing the items of information such as ruled lines and titles is called fixed data and data for printing the items of information such as the supplier's names and prices is called variable data so as to be distinguished from the fixed data.

The label printer of this embodiment is similar to that of the first embodiment except that a RAM 16 shown by broken lines in FIG. 3 is further provided and the control program stored in the ROM 4 is modified. In the first embodiment, the frame memory 9 is divided to store a plurality of items of image data, but in the second embodiment, the frame memory is not divided in order to prevent the control program from being complicated.

RAM 16 is always backed up by a battery, for example, to store data in a nonvolatile fashion. A fixed data memory 16A into which fixed data is previously set is provided in the RAM 16.

Figures 10, 11:
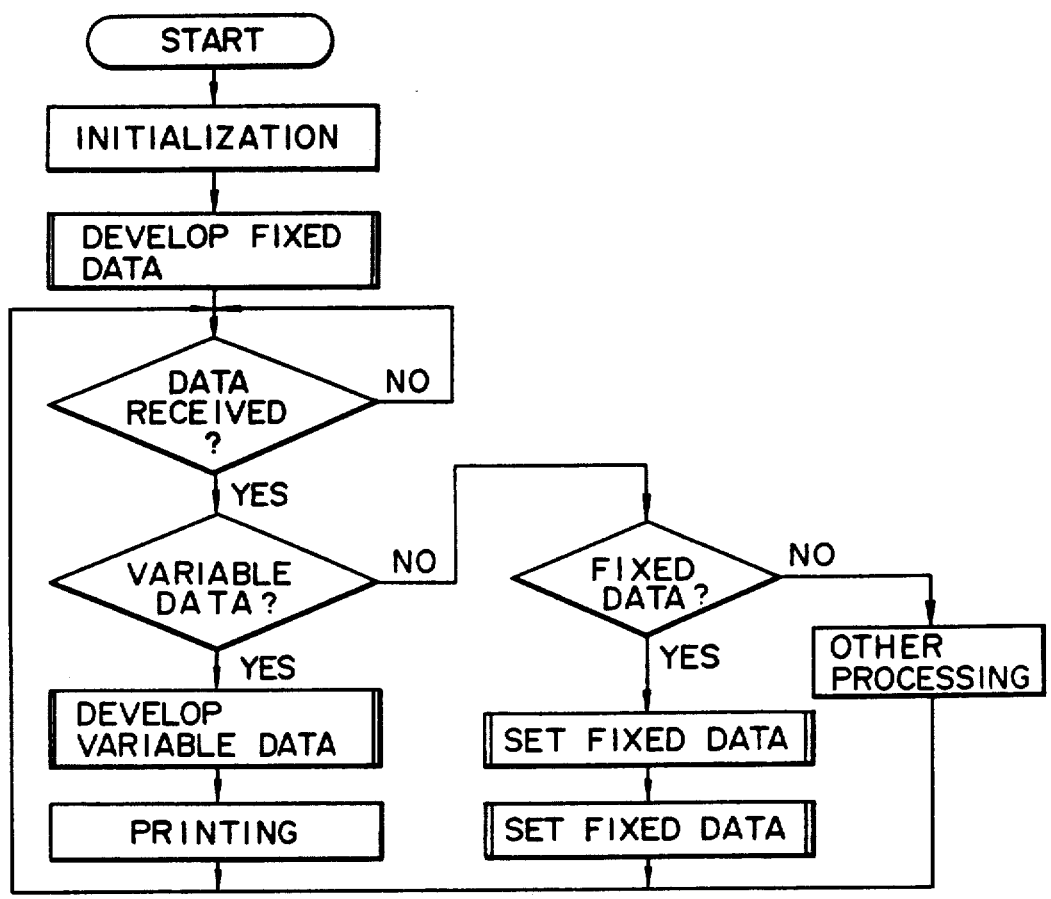
FIG. 10 is a flowchart showing the label issuing process of the label printer according to a second embodiment of this invention.
FIG. 11 shows an example of an image printed on a label by the label printer according to the second embodiment.

FIG. 10 is a flowchart showing the label issuing process of the label printer according to the second embodiment of this invention.

When the power source is turned on, the label issuing process is started and memories are first initialized.

Then, fixed data is subjected to the developing process. In the developing process, the fixed data is read out from memory 16B, developed into a dot matrix pattern by use of the character generator 15A and stored as part of image data into the frame memory 9. Then, the CPU 2 waits until printing data supplied from the host computer HC is received. When the printing data is received, it is checked whether the received printing data is variable data, fixed data or other data. If the received printing data is the variable data, the variable data is developed into a dot matrix pattern by use of the character generator 15A or bar code conversion table 15B and stored into the frame memory 9 as part of image data. The thus synthesized image data is read out from the frame memory 9 and supplied to the motor driver 14 and printing head driver 12. As a result, an image corresponding to the image data is printed on label paper.

If the received printing data is fixed data, the fixed data is set into the memory 16A, and then read out from the memory 16A. At this time, the fixed data is developed into a dot matrix pattern by use of the character generator 15A and stored into the frame memory 9 as part of image data. Further, if the received printing data is the other data such as a label-issuing number, a corresponding process is effected.

With the above label printer, when the power source is turned on, the developing process for the fixed data is effected. At this time, if the fixed data is not prepared in the memory 16A, the dot matrix pattern has not been stored into the frame memory 9. However, if the label printer receives fixed data supplied from the host computer, the fixed data is set into the fixed data memory 16A. Even if the power source is turned off, the fixed data is not erased in the fixed data memory 16A. Therefore, when the power source is turned on again, creation of image data can be started without setting the fixed data. The content of the frame memory 9 is erased when the power source is turned off.

Assume now that a label is issued in a condition that fixed data is set in the memory 16A. First, when the power source is turned on, fixed data is read out from fixed data memory 16A. The fixed data is developed into a dot matrix pattern corresponding to an image shown in FIG. 8 by means of the character generator 15A and is then stored into the frame memory 9.

Next, the host computer is caused to supply variable data for printing bar codes and characters to the label printer. When the label printer receives the variable data, the variable data is temporarily stored in the reception buffer 5A, is developed into a dot matrix pattern corresponding to an image shown in FIG. 9 by means of the character generator 15A, and is then stored into the frame memory 9.

At this time, the pattern corresponding to the image of FIG. 9 is overlapped with the pattern corresponding to the image of FIG. 8 in the frame memory 9 to create complete image data for one label.

After the complete image data is obtained, the printing operation is effected based on the image data. In this way, an image shown in FIG. 11 is printed on label paper and a label having the image printed thereon is issued.

According to the second embodiment, if fixed data is previously stored in the fixed data memory 16A, the fixed data can be used for creating image data when the power source is turned on. Therefore, at the time of actually issuing labels, the host computer HC is not required to transmit the fixed data. On the printer side, since it is not necessary to repeatedly develop the fixed data into the dot matrix pattern, time required for obtaining image data can be reduced. As a result, the average value of the label issuing speed can be enhanced.

Further, the fixed data can be changed by causing the host computer to supply fixed data. When the fixed data is received, the fixed data is first set into the fixed data memory 16A and a dot matrix pattern obtained by developing the fixed data is set into the frame memory 9. If the fixed data is transmitted prior to the variable data, the dot matrix pattern obtained by developing the fixed data is already set in the frame memory 9 when a dot matrix pattern is obtained by developing the variable data. As a result, it becomes possible to start the printing operation based on image data created by synthesizing the dot matrix patterns immediately after the variable data has been developed.

In this way, with the above label printer, change of fixed data can be effected without an trouble.

Next, a label printer according to a third embodiment of this invention is explained with reference to FIG. 12. The label printer is similar to that of the second embodiment except that the control program is modified to set a plurality of items of fixed data with identification codes attached thereto into a fixed data memory 16A, select one of the items of fixed data based on the identification code, and develop the selected fixed data into a dot matrix pattern.

FIG. 12 is a flowchart showing the label issuing process of the label printer of the third embodiment. When the power source is turned on and the label issuing process is started, memories are first initialized. Then, a CPU 2 waits until data supplied from a host computer is received. When data is received, it is checked whether the received data is variable data, fixed data, the paging identification code of fixed data or other data. If the received data is fixed data, a code is attached to the received fixed data and then the data is set into the fixed data memory 16A. The same operation is repeatedly effected to set a plurality of items of fixed data into the fixed data memory 16A.

If the received data is the paging identification code of fixed data, it is checked whether or not fixed data specified by the identification code has been developed into a dot matrix pattern and set into the frame memory 9. If it is stored in the frame memory 9, the fixed data is not read out from the memory 16A. On the other hand, if the fixed data is not set in the frame memory 9, then fixed data specified by the identification code is read out from the memory 16A, developed into a dot matrix pattern by use of the character generator 15A and set into the frame memory 9.

If the received data is variable data, then the variable data is developed into a dot matrix pattern by use of the character generator 15A or the bar code conversion table 15B and set into the frame memory 9.

Thus, image data is synthesized in the frame memory 9. Thereafter, the motor driver 8 and thermal head driver 10 are controlled based on the content of the frame memory 9 so as to print data on label paper.

Further, if the received data is the other data, a corresponding process is effected.

In the third embodiment, a plurality of items of fixed data can be previously set into the fixed data memory 16A and one of the items of fixed data can be read out from the fixed data memory 16A based on an identification code specifying one of the items of fixed data and supplied from the host computer HC. Then, a dot matrix pattern corresponding to the fixed data can be set into the frame memory 9.

Also, in this embodiment, the dot matrix pattern corresponding to the fixed data can be previously set in the frame memory 9. Therefore, at the time of actually issuing labels, the host computer is only required to transmit variable data and time from the data transmission to the completion of the printing operation can be reduced.

Further, in a case where fixed data is changed, it is only necessary to transmit an identification code from the host computer HC and it is not necessary to transmit fixed data. Therefore, the time can be further reduced.

Since it is checked whether or not a dot matrix pattern corresponding to fixed data before the fixed data is read out from the fixed data memory 16A, the process of developing the fixed data can be prevented from being unnecessarily effected. Thus, the printing preparation time can be further reduced.

What is claimed is:

1. A label printer comprising:
input means for inputting printing data;
memory means for storing items of image data;
printing means for printing labels according to an item of said image data; and
processing means for processing printing data input by said input means, said processing means including means for checking whether said memory means already contains image data corresponding to the input printing data; means for, when it is detected that the memory means does not contain the corresponding image data, creating in said memory means new image data from the input printing data as the corresponding image data and transferring the corresponding image data from said memory means to said printing means; and means for, when it is detected that the memory means contains the corresponding image data, transferring the detected corresponding image data from said memory means to said printing means.

2. A label printer according to claim 1, wherein said processing means further includes means for partitioning said memory means into memory areas each for storing image data for one label.

3. A label printer according to claim 2, wherein said partitioning means includes means for determining the memory capacity of each memory area according to the image data created from printing data input by said input means.

4. A label printer according to claim 2, wherein said processing means further includes a memory section having a plurality of memory areas which are assigned respectively to the memory areas of said memory means and which stores printing data corresponding to the image data stored in the memory areas of said memory means.

5. A label printer comprising:
input means for inputting first printing data for characters and bar codes;
first memory means for storing second printing data for titles and ruled lines;
second memory means for storing image data;
printing means for printing labels according to said image data; and
processing means for processing first printing data input by said input means and second printing data stored in said first memory means, said processing means including first creating means for creating in said second memory means a fixed graphic pattern from the second printing data; second creating means for creating, each time first printing pattern is input, in said second memory means a variable graphic pattern from the first printing data, whereby the fixed and variable graphic patterns are combined into image data; and transfer means for transferring each image data from said second memory means to said printing means.

6. A label printer according to claim 5, wherein:
said first memory means includes a plurality of memory areas for storing items of second printing data; and
said first creating means includes means for reading out one of the second printing data items stored in the memory areas of said first memory means.

7. A label printer according to claim 6, wherein the second printing data items stored in the memory areas of said memory means respectively have an identification code attached thereto, said identification code being input by said input means, and said reading means includes means for determining said second printing data item according to the identification code additionally input by said input means.

8. A label printer according to claim 5, wherein:
said first memory means comprises a nonvolatile memory device; and
said first creating means includes means for reading out fixed data stored in said nonvolatile memory device upon application of power to create said fixed graphic pattern.

* * * * *

UNITED STATES PATENT AND TRADEMARK OFFICE
CERTIFICATE OF CORRECTION

Page 1 of 2

PATENT NO. : 5,025,397
DATED : June 18, 1991
INVENTOR(S) : SUZUKI, Michio

It is certified that error appears in the above-indentified patent and that said Letters Patent is hereby corrected as shown below:

Delete drawing Fig. 6 and substitute therefor Fig. 6 as shown on the attached page.

Signed and Sealed this

Twenty-sixth Day of November 1996

Attest:

BRUCE LEHMAN

Attesting Officer

Commissioner of Patents and Trademarks

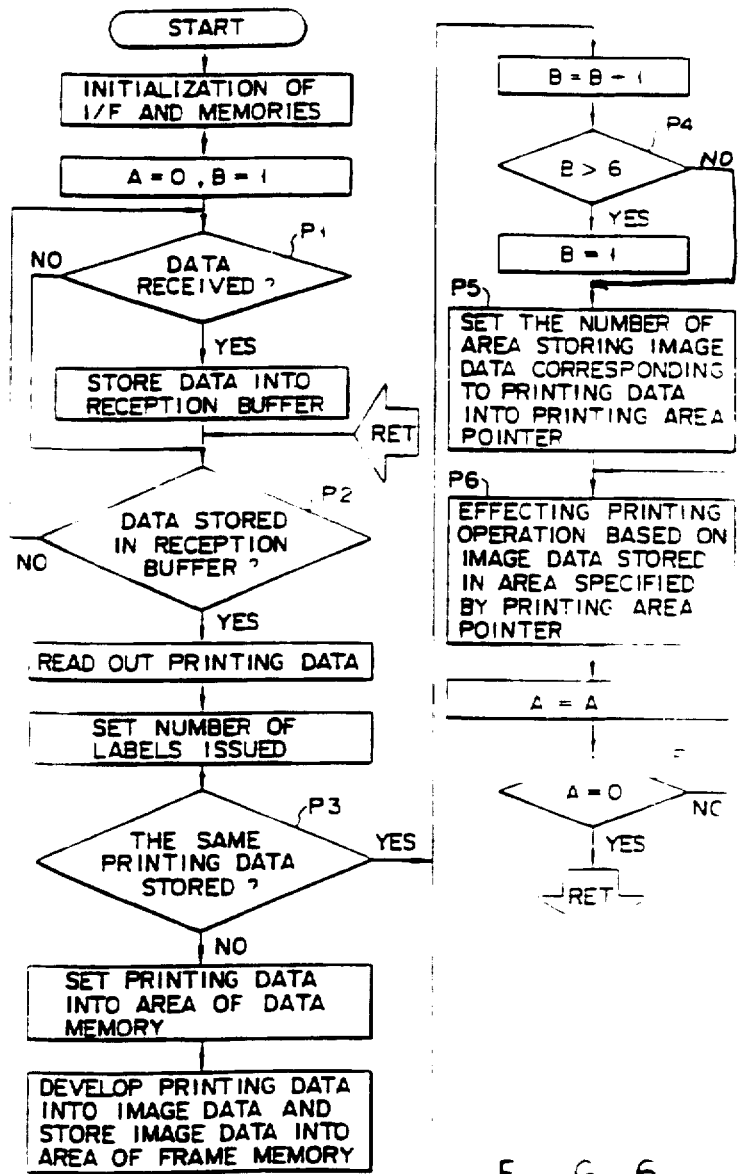
F G 6